United States Patent
Jang et al.

(10) Patent No.: US 10,412,386 B2
(45) Date of Patent: Sep. 10, 2019

(54) SYSTEM ON CHIP AND DATA PROCESSING SYSTEM INCLUDING THE SAME

(71) Applicant: Samsung Electronics Co., Ltd., Suwon-si (KR)

(72) Inventors: Hyuk Jae Jang, Suwon-si (KR); Nyeong Kyu Kwon, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 245 days.

(21) Appl. No.: 14/645,542

(22) Filed: Mar. 12, 2015

(65) Prior Publication Data
US 2015/0319439 A1    Nov. 5, 2015

(30) Foreign Application Priority Data
May 2, 2014    (KR) .................. 10-2014-0053174

(51) Int. Cl.
| H04N 19/117 | (2014.01) |
|---|---|
| H04N 19/126 | (2014.01) |
| H04N 19/11 | (2014.01) |
| H04N 19/105 | (2014.01) |
| H04N 19/184 | (2014.01) |
| H04N 19/13 | (2014.01) |

(Continued)

(52) U.S. Cl.
CPC ......... *H04N 19/117* (2014.11); *H04N 19/105* (2014.11); *H04N 19/11* (2014.11); *H04N 19/124* (2014.11); *H04N 19/126* (2014.11); *H04N 19/13* (2014.11); *H04N 19/132* (2014.11); *H04N 19/146* (2014.11); *H04N 19/172* (2014.11); *H04N 19/176* (2014.11); *H04N 19/184* (2014.11); *H04N 19/107* (2014.11); *H04N 19/147* (2014.11)

(58) Field of Classification Search
CPC .... H04N 19/105; H04N 19/11; H04N 19/117; H04N 19/126; H04N 19/13; H04N 19/146; H04N 19/176; H04N 19/184
USPC ..................................................... 375/240.03
See application file for complete search history.

(56) References Cited

U.S. PATENT DOCUMENTS

| 6,111,913 A * | 8/2000 | Murdock ............. H04N 19/159 375/240.03 |
|---|---|---|
| 6,690,833 B1 * | 2/2004 | Chiang ................ H04N 19/176 375/E7.134 |

(Continued)

FOREIGN PATENT DOCUMENTS

| JP | 2007281574 | 10/2007 |
|---|---|---|
| JP | 2009017127 | 1/2009 |
| KR | 100950275 | 3/2010 |

*Primary Examiner* — Jamie J Atala
*Assistant Examiner* — James T Boylan
(74) *Attorney, Agent, or Firm* — Onello & Mello, LLP

(57) ABSTRACT

IN a system on chip (SoC) for adaptively adjusting a bit rate, the SoC includes a central processing unit (CPU) configured to compare a first reference bit rate with a bit rate of a previous frame and to output a first parameter, a spatial filter configured to adjust a cutoff frequency using the first parameter, to filter high-frequency components from a current frame using an adjusted cutoff frequency and to output a filtered current frame, and a video codec configured to adjust a bit rate of a current macroblock in the filtered current frame using a second parameter generated according to a result of comparing a second reference bit rate with a bit rate of a previous macroblock in the filtered current frame.

11 Claims, 16 Drawing Sheets

(51) Int. Cl.
*H04N 19/176* (2014.01)
*H04N 19/146* (2014.01)
*H04N 19/172* (2014.01)
*H04N 19/124* (2014.01)
*H04N 19/132* (2014.01)
*H04N 19/147* (2014.01)
*H04N 19/107* (2014.01)

(56) References Cited

U.S. PATENT DOCUMENTS

| | | | |
|---|---|---|---|
| 7,257,159 B1* | 8/2007 | Breeuwer | H04N 19/176 375/240.03 |
| 7,720,145 B2* | 5/2010 | Muthukrishnan | H04N 19/152 375/240 |
| 8,175,149 B2 | 5/2012 | Jun et al. | |
| 8,238,424 B2 | 8/2012 | Chang et al. | |
| 8,451,891 B2 | 5/2013 | Seok et al. | |
| 2003/0081672 A1* | 5/2003 | Li | H04N 19/172 375/240.01 |
| 2005/0105815 A1* | 5/2005 | Zhang | H04N 19/197 382/251 |
| 2006/0114987 A1* | 6/2006 | Roman | H04N 7/142 375/240.01 |
| 2008/0198926 A1* | 8/2008 | Bordes | H04N 19/619 375/240.03 |
| 2009/0074084 A1* | 3/2009 | Drezner | H04N 19/139 375/240.29 |
| 2010/0014583 A1 | 1/2010 | Shimizu et al. | |
| 2010/0027621 A1 | 2/2010 | Yano | |
| 2010/0128996 A1* | 5/2010 | Lee | H04N 19/152 382/238 |
| 2010/0158108 A1* | 6/2010 | Agarwal | H04N 19/176 375/240.03 |
| 2011/0200099 A1 | 8/2011 | Kim et al. | |
| 2012/0281753 A1 | 11/2012 | Misra et al. | |
| 2012/0281756 A1* | 11/2012 | Roncero Izquierdo | H04N 19/139 375/240.13 |
| 2012/0307890 A1* | 12/2012 | Lu | H04N 19/176 375/240.03 |
| 2014/0269944 A1* | 9/2014 | Isnardi | H04N 19/80 375/240.29 |

* cited by examiner

FIG. 6

$$Q\text{-Matrix} = \begin{bmatrix} UQP1 & UQP2 & UQP3 & UQP4 \\ UQP5 & UQP6 & UQP7 & UQP8 \\ UQP9 & UQP10 & UQP11 & UQP12 \\ UQP13 & UQP14 & UQP15 & UQP16 \end{bmatrix} \Leftrightarrow$$

| 4 | TTU | | |
|---|---|---|---|
| TU1 | TU2 | TU3 | TU4 |
| TU5 | TU6 | TU7 | TU8 |
| TU9 | TU10 | TU11 | TU12 |
| TU13 | TU14 | TU15 | TU16 |

$$QP = \frac{\Sigma UQPk}{16}$$

FIG. 9

TABLE

| Encodig Tools | Overshoot | Undershoot |
|---|---|---|
| Cut-off frequency | DECREASE | INCREASE |
| Q-Matrix | INCREASE Q-MATRIX VALUES | DECREASE Q-MATRIX VALUES |
| QUANTIZATION STEP SIZE | INCREASE | DECREASE |
| BIT CHANGE | ENABLE | DISABLE |
| MACRO BLOCK SKIP OPERATION | ENABLE | DISABLE |

SYSTEM ON CHIP AND DATA PROCESSING SYSTEM INCLUDING THE SAME

CROSS-REFERENCE TO RELATED APPLICATIONS

This application claims priority under 35 U.S.C. § 119(a) from Korean Patent Application No. 10-2014-0053174 filed on May 2, 2014, the disclosure of which is hereby incorporated by reference in its entirety.

BACKGROUND

Embodiments of the present disclosure relate to an integrated circuit, and more particularly, to a system on chip (SoC) including a video codec for adaptively adjusting a bit rate, and a data processing system including the SoC.

A codec is a device or a computer program capable of encoding or decoding digital data or signals. The word codec is a portmanteau of "coder" and "decoder" or "compressor" and "decompressor". A codec uses a quantization technique to increase an encoding efficiency. Quantization is the process of mapping a large set of input values to a smaller set. A device or algorithmic function that performs quantization is called a quantizer.

In image processing, the quantization is a lossy compression technique of compressing a range of values into a single quantum value. The quantization can be controlled using a quantization parameter. When the quantization parameter is adjusted, the quality of picture can be changed. In other words, the quantization parameter greatly impacts on a compression rate. When the quantization parameter is very small, most details are maintained. However, when the quantization parameter increases, a bit rate decreases.

Conventional codecs adjust the bit rate by adjusting the quantization parameter only.

SUMMARY

Some embodiments of the present disclosure may provide a system on chip (SoC) for adaptively controlling a bit rate of a current frame based on a bit rate of a previous frame and for adaptively adjusting a bit rate of a current macroblock in the current frame based on a bit rate of a previous macroblock in the current frame. Some embodiments of the present disclosure may also provide a data processing system including the same.

According to some embodiments of the present disclosure, there is provided an SoC including a central processing unit (CPU) configured to compare a first reference bit rate with a bit rate of a previous frame and to output a first parameter, a spatial filter configured to adjust a cutoff frequency using the first parameter, to filter high-frequency components from a current frame using an adjusted cutoff frequency and to output a filtered current frame, and a video codec configured to adjust a bit rate of a current macroblock in the filtered current frame using a second parameter generated according to a result of comparing a second reference bit rate with a bit rate of a previous macroblock in the filtered current frame.

The CPU may calculate the second reference bit rate using the first reference bit rate and the number of macroblocks in the filtered current frame.

The video codec may include a quantizer configured to quantize the current macroblock using the second parameter and a quantization step size adjusting circuit configured to adjust a quantization step size of the quantizer using the second parameter. The video codec may adjust unit quantization parameters of respective units related with the current macroblock using the second parameter. The video codec may adjust a quantization step size of each of the unit quantization parameters using the second parameter.

Alternatively, the video codec may include a bit change circuit configured to determine whether to change a particular bit in the current macroblock in response to the second parameter. As another alternative, the video codec may include an entropy coder and a macroblock skip decision circuit configured to decide whether to transmit the current macroblock to the entropy coder in response to the second parameter.

As still another alternative, the video codec may include an entropy coder, a bit change circuit configured to decide whether to change a particular bit included in the current macroblock in response to the second parameter, and a macroblock skip decision circuit configured to decide whether to transmit a macroblock output from the bit change circuit to the entropy coder in response to the second parameter. As yet another alternative, the video codec may include an entropy coder configured to calculate the bit rate of the previous frame and the bit rate of the previous macroblock and to output an encoded bit stream corresponding to the filtered current frame. The video codec may include the spatial filter.

According to other embodiments of the present disclosure, there is provided a data processing system including a memory device configured to store a current frame and an SoC configured to process the current frame output from the memory device. The SoC may include a CPU configured to compare a first reference bit rate with a bit rate of a previous frame and to output a first parameter, a spatial filter configured to adjust a cutoff frequency using the first parameter, to filter high-frequency components from a current frame using an adjusted cutoff frequency and to output a filtered current frame, and a video codec configured to adjust a bit rate of a current macroblock in the filtered current frame using a second parameter generated according to a result of comparing a second reference bit rate with a bit rate of a previous macroblock in the filtered current frame.

According to further embodiments of the present disclosure, there is provided an SoC including a spatial filter configured to adjust a bit rate of a frame and a video codec configured to adjust a bit rate of a macroblock included in a filtered current frame output from the spatial filter.

The SoC may further include a CPU configured to compare a first reference bit rate with a bit rate of a previous frame and generate a first parameter. The spatial filter may adjust a cutoff frequency using the first parameter, filter high-frequency components from a current frame using an adjusted cutoff frequency, and may output the filtered current frame.

The video codec may adjust a bit rate of a current macroblock in the filtered current frame using a second parameter generated according to a result of comparing a second reference bit rate with a bit rate of a previous macroblock in the filtered current frame.

BRIEF DESCRIPTION OF THE DRAWINGS

The above and other features and advantages of the present disclosure will become more apparent by describing in detail exemplary embodiments thereof with reference to the attached drawings in which:

FIG. 6 is a conceptual diagram explaining the operation of a Q-matrix circuit illustrated in FIG. 3;

FIG. 9 is a table explaining the operation of encoding tools illustrated in FIG. 3;

DETAILED DESCRIPTION

Figure 1:
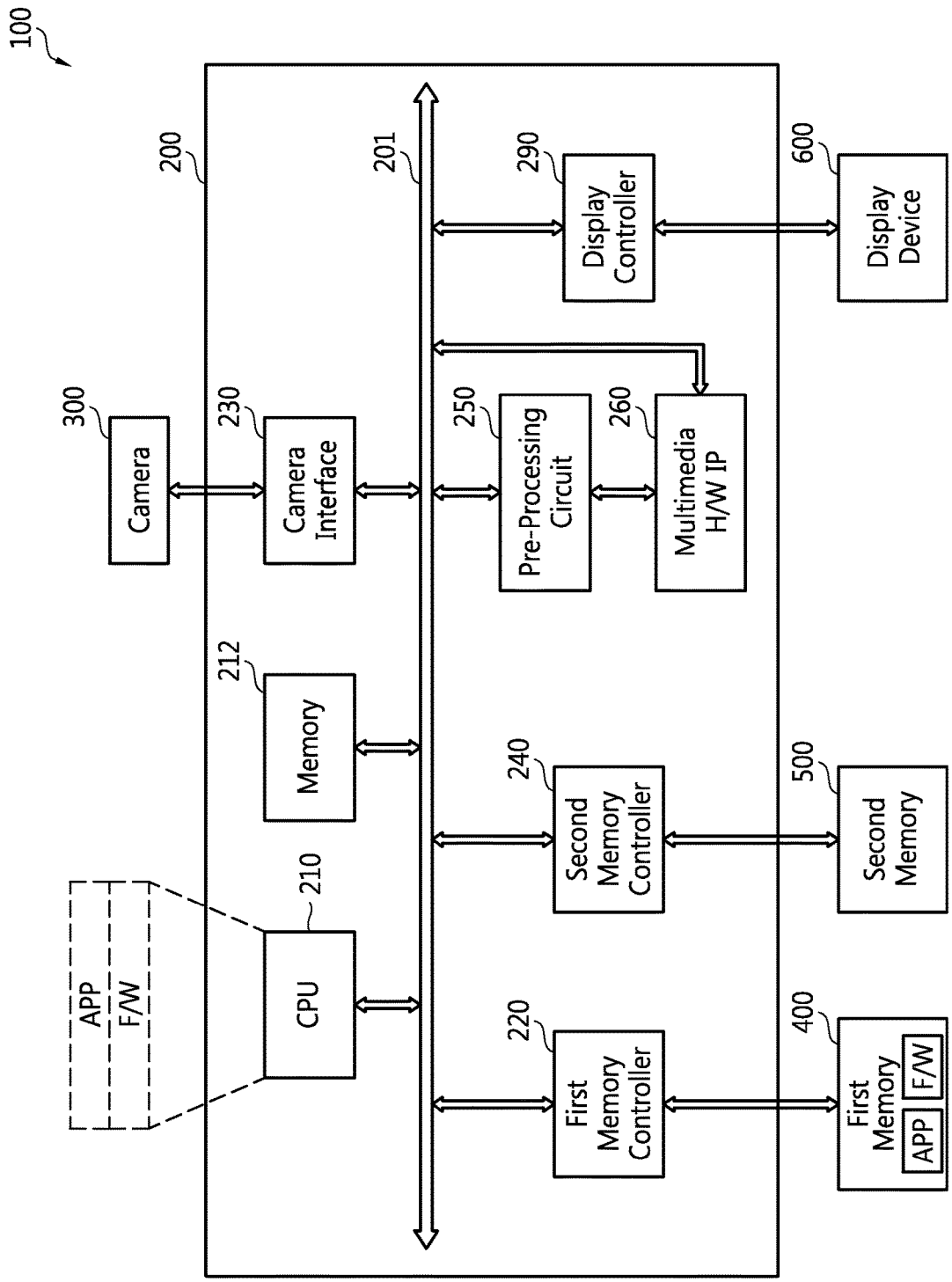
FIG. 1 is a block diagram of a data processing system according to some embodiments of the present disclosure.

The present disclosure now will be described more fully hereinafter with reference to the accompanying drawings, in which embodiments of the present disclosure are shown. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 100 according to some embodiments of the present disclosure. The data processing system 100 may include a controller 200, a camera 300, a first memory device 400, a second memory device 500, and a display device 600.

The data processing system 100 may be implemented as a system, such as a personal computer (PC) or a portable electronic device, which can process image data or video. The image data may be still image data, moving image data, or stereoscopic data. The portable electronic device may be a laptop computer, a cellular phone, a smartphone, a tablet PC, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, or an internet of everything (IoE) device.

The controller 200 may control the camera 300, the first memory device 400, the second memory device 500, and the display device 600. The controller 200 may be implemented as an integrated circuit (IC), a system on chip (SoC), an application processor (AP), or a mobile AP.

The controller 200 may include a pre-processing circuit 250 for adjusting a bit rate (or bit generation) for each frame and a multimedia hardware (H/W) intellectual property (IP) 260 for adjusting a bit rate of each of macroblocks included in a filtered current frame that is output from the pre-processing circuit 250.

Although the pre-processing circuit 250 and the multimedia H/W IP 260 are separated from each other in the embodiments illustrated in FIG. 1 for clarity of the description, the pre-processing circuit 250 may be embedded in the multimedia H/W IP 260. For example, the pre-processing circuit 250 and the multimedia H/W IP 260 may be formed together in a single chip.

The controller 200 may include a central processing unit (CPU) 210, a memory 212, a first memory controller 220, a camera interface 230, a second memory controller 240, a pre-processing circuit 250, a multimedia H/W IP 260, and a display controller 290.

The CPU 210 may control at least one of the elements (or components) 212, 220, 230, 240, 250, 260, and 290 via a bus 201. The CPU 210 may generate a first parameter for controlling a cutoff frequency of the pre-processing circuit 250. For example, firmware (F/W) executed by the CPU 210 may generate the first parameter.

The memory 212 may store instructions and/or data for the operation of the CPU 210. The memory 212 may also store initial values for the operations of the elements 250 and 260. For example, the memory 212 may store initial values necessary for the operation of at least one of elements 275, 277, 279, 281, and 283, which will be described with reference to FIG. 3.

The first memory controller 220 may write application APP, firmware F/W, and/or data to the first memory device 400, or may read the application APP, the firmware F/W, and/or the data from the first memory device 400. For example, when the data processing system 100 is booted, the application APP and/or the firmware F/W stored in the first memory device 400 may be loaded to the CPU 210 and then may be executed by the CPU 210. In addition, data generated by the execution of the application APP and/or the firmware F/W may be stored in the memory 212. The memory 212 may be implemented as a register, a cache, or a static random access memory (SRAM).

The camera interface 230 may transmit image data from the camera 300 to the second memory controller 240 via the bus 201. The second memory controller 240 may store the image data in the second memory device 500. The camera interface 230 may be implemented as a camera serial interface (CSI). The second memory controller 240 may transmit the image data from the second memory device 500 to the pre-processing circuit 250 and/or the multimedia H/W IP 260 via the bus 201.

The pre-processing circuit 250 may adjust a cutoff frequency using the first parameter, may filter high-frequency components from the image data output from the second memory device 500 using the adjusted cutoff frequency, and may output the filtered image data (e.g., the filtered current frame) to the multimedia H/W IP 260.

The first parameter may be generated by the firmware F/W executed by the CPU 210. The pre-processing circuit 250 may include a spatial filter.

The multimedia H/W IP 260 may control the number of bits currently generated (or a current bit rate) using at least one of encoding tools, which will be described later, based on the number of bits generated previously (or a previous bit rate). The number of bits generated previously may indicate the number of bits that have been generated for each frame or each macroblock, and the number of bits currently generated may indicate the number of bits which will be generated for each frame or each macroblock. Here, an H/W IP may be a function block used in the controller 200. The function block may be an H/W module with unique features.

The multimedia H/W IP 260 may be implemented as a video codec. The video codec is a device that compresses or decompresses digital video data.

The display controller 290 may output to the display device 600 image data corresponding to an encoded bit stream that is output from the multimedia H/W IP 260. The display controller 290 may support display serial interface (DSI). The display controller 290 may decode a bit stream that has been encoded by the multimedia H/W IP 260, and may output the decoded image data to the display device 600.

The camera 300 may convert an optical image into an electrical signal, and may generate image data according to the conversion result. The camera 300 may include a complementary metal-oxide semiconductor (CMOS) image sensor.

The first memory device 400 may be implemented as a non-volatile memory device that can store an application APP or firmware F/W. For example, the first memory device 400 may be implemented as a flash-based memory device. The flash-based memory device may be a multimedia card (MMC), an embedded MMC (eMMC), a universal flash storage (UFS), or a solid state drive (SSD).

The second memory device 500 may store image data captured by the camera 300. The image data stored in the second memory device 500 may be processed (e.g., encoded) by the multimedia H/W IP 260. The second memory device 500 may also store the image data processed (e.g., encoded) by the multimedia H/W IP 260. For example, the second memory device 500 may be implemented as a volatile memory device such as a dynamic random access memory (DRAM).

The display device 600 may display the image data processed by the controller 200.

Figure 2:
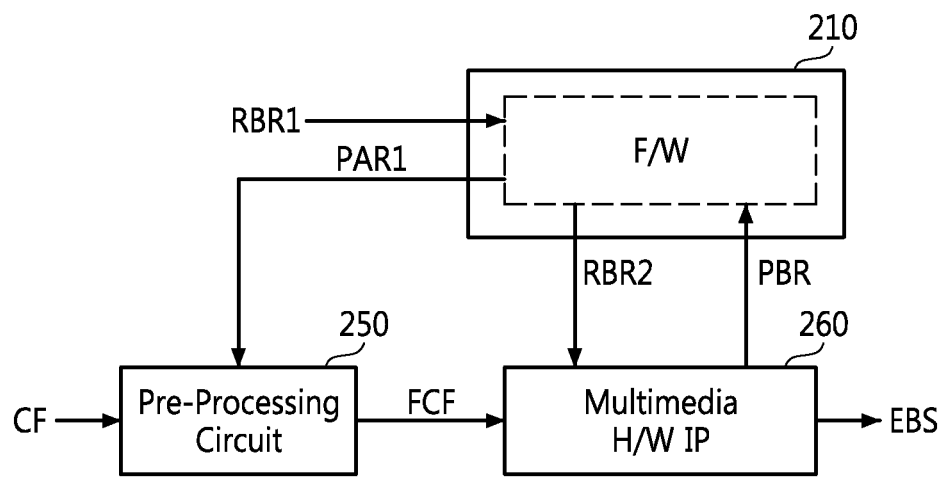
FIG. 2 is a block diagram explaining the operations of a central processing unit (CPU), a pre-processing circuit, and a multimedia hardware (H/W) intellectual property (IP) illustrated in FIG. 1.

FIG. 2 is a block diagram explaining the operations of the CPU 210, the pre-processing circuit 250, and the multimedia H/W IP 260 illustrated in FIG. 1. Referring to FIGS. 1 and 2, firmware F/W executed in the CPU 210 may perform a frame level control.

For clarity of the description, it is assumed here that a frame being processed or a frame to be processed is a current frame, and a macroblock being processed or a macroblock to be processed is a current macroblock. Accordingly, a frame processed before the current frame is processed is called a previous frame, and a macroblock processed before the current macroblock is processed is called a previous macroblock.

The CPU 210 or firmware F/W may compare a first reference bit rate RBR1 with a previous bit rate PBR (e.g., the number of bits generated in a previous frame), and may generate a first parameter PAR1 according to the comparison result. Here, the first reference bit rate RBR1 may be a bit rate of each frame, and the first parameter PAR1 may include one or more control signals.

When the pre-processing circuit 250 is implemented as a spatial filter, e.g., a two-dimensional (2D) variable spatial filter, the first parameter PAR1 may include a vertical filter coefficient control parameter and a horizontal filter coefficient control parameter. The spatial filter 250 may adjust a cutoff frequency using the first parameter PAR1, may filter high-frequency components included in a current frame CF using the adjusted cutoff frequency, and may output a filtered current frame FCF to the multimedia H/W IP 260.

In the same frame, the multimedia H/W IP 260 may adjust the bit rate of a macroblock to be processed in the filtered current frame FCF based on the bit rate of a macroblock that has been processed in the filtered current frame FCF, using a second parameter. The multimedia H/W IP 260 may output an encoded bit stream EBS with respect to the filtered current frame FCF including a plurality of macroblocks that have been processed. The multimedia H/W IP 260 may compare a second reference bit rate RBR2 output from the CPU 210 with the bit rate of a previous macroblock included in the filtered current frame FCF, and may generate the second parameter according to the comparison result.

The CPU 210 may calculate the second reference bit rate RBR2 using the first reference bit rate RBR1 and the number N of macroblocks included in the filtered current frame FCF. For example, the CPU 210 may calculate the second reference bit rate RBR2 using Equation 1:

$$RBR2=RBR1/N. \quad (1)$$

With respect to two consecutive frames, the multimedia H/W IP 260 may adjust the bit rate of a current macroblock included in the filtered current frame FCF using the second parameter generated according to a result of comparing the second reference bit rate RBR2 output from the CPU 210 with the bit rate of a reference macroblock. Here, the reference macroblock may be the last macroblock of the previous frame, and the current macroblock may be the first macroblock of the current frame.

The multimedia H/W IP 260 may calculate the bit rate PBR of the processed frame, and may transmit the bit rate PBR to the CPU 210. The bit rate of the filtered current frame FCF may be transmitted as the bit rate PBR of a previous frame to the CPU 210, and may be used to adjust the bit rate of a subsequent frame.

Figure 3:
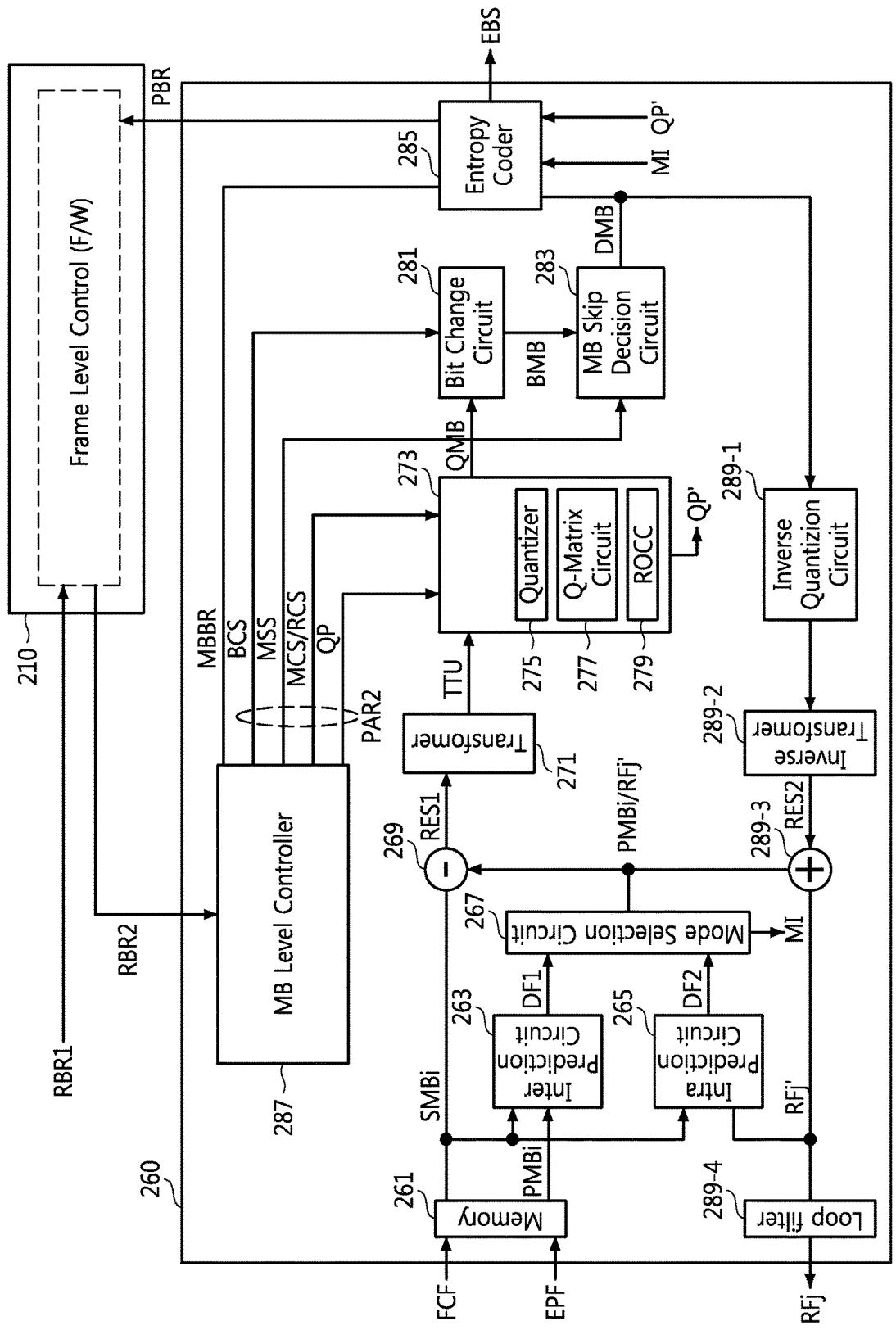
FIG. 3 is a block diagram of the multimedia H/W IP illustrated in FIG. 1.

FIG. 3 is a block diagram of the multimedia H/W IP 260 illustrated in FIG. 1. Referring to FIGS. 1 through 3, the multimedia H/W IP (e.g., video codec) 260 may include a memory 261, an inter prediction circuit 263, an intra prediction circuit 265, a mode selection circuit 267, a subtractor 269, a transformer 271, a quantization circuit 273, a bit change circuit 281, a macroblock skip decision circuit 283, an entropy coder 285, a macroblock level controller 287, an inverse quantization circuit 289-1, an inverse transformer 289-2, an adder 289-3, and a loop filter 289-4.

According to embodiments, the quantization circuit 273 may include at least one of a quantizer 275, a Q-matrix circuit 277, and a rounding offset control circuit (ROCC) 279.

Figure 4:
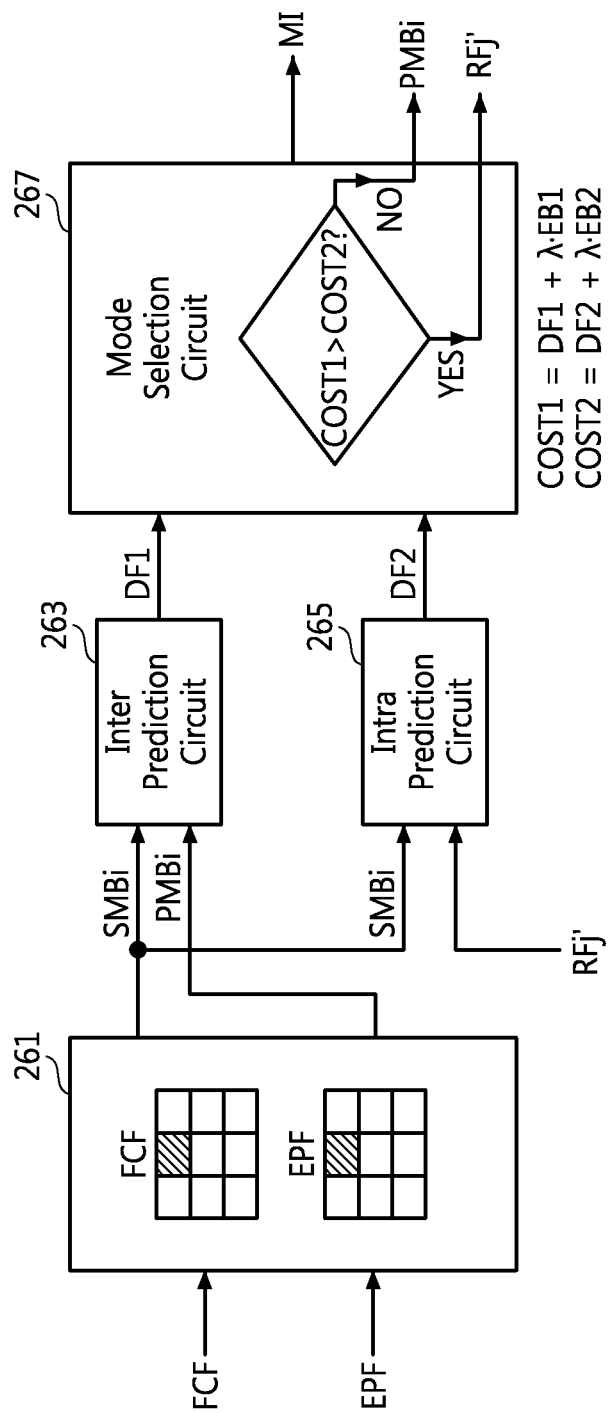
FIG. 4 is a diagram explaining the operations of a memory, an inter prediction circuit, an intra prediction circuit, and a mode selection circuit illustrated in FIG. 3.

FIG. 4 is a diagram explaining the operations of the memory 261, the inter prediction circuit 263, the intra prediction circuit 265, and the mode selection circuit 267 illustrated in FIG. 3. Referring to FIGS. 3 and 4, the memory 261 may receive and store the filtered current frame FCF output from the pre-processing circuit 250 and an encoded previous frame EPF output from the second memory 500. For example, the encoded previous frame EPF may be used as a reference frame for an inter prediction.

The memory 261 may also receive and store the frames FCF and EPF, and may output macroblocks SMBi and PMBi corresponding to the frames FCF and EPF, respectively, according to the control of a memory controller (not shown). The memory 261 may output a plurality of macroblocks SMBi included in the filtered current frame FCF in processing order in which the macroblocks SMBi are processed. The memory 261 may also output a plurality of macroblocks PMBi in the encoded previous frame EPF in processing order. For clarity of the description, each of the frames FCF and EPF may include nine macroblocks in the embodiments illustrate in FIG. 4, but this is just an example for explanation.

The inter prediction circuit 263 may calculate a difference between an $i^{th}$ macroblock SMBi of the filtered current frame FCF and an $i^{th}$ macroblock PMBi of the encoded previous frame EPF, and may output a first difference value DF1 according to the calculation result. Here, the 'i' is from two to nine.

The intra prediction circuit 265 may calculate a difference between the $i^{th}$ macroblock SMBi of the filtered current frame FCF and a $j^{th}$ macroblock RFj' output from the adder 289-3, and may output a second difference value DF2 according to the calculation result.

For example, when "j" is (i−1), the $j^{th}$ macroblock RFj' may be a macroblock corresponding to an $(i−1)^{th}$ macroblock of the filtered current frame FCF. Each of the difference values DF1 and DF2 may be the sum of absolute differences (SAD).

The mode selection circuit 267 may compare a first cost COST1 with a second cost COST2, and may output the macroblock PMBi or RFj' corresponding to a cost having a less value between the first cost COST1 and the second cost COST2. The first cost COST1 is defined as Equation 2:

$$COST1=DF1+\lambda *EB1, \qquad (2)$$

where $\lambda$ is a constant for a weighted value and EB1 is the number of bits predicted to be generated when the inter prediction is selected.

The second cost COST2 is defined as Equation 3:

$$COST2=DF2+\lambda *EB2, \qquad (3)$$

where $\lambda$ is a constant for a weighted value and EB2 is the number of bits predicted to be generated when an intra prediction is selected.

When the first cost COST1 is greater than the second cost COST2, the mode selection circuit 267 may output the macroblock RFj' received from the adder 289-3. In other words, the inter prediction may be performed in the multimedia H/W IP 260. However, when the first cost COST1 is less than the second cost COST2, the mode selection circuit 267 may output the macroblock PMBi in the encoded previous frame EPF. In other words, the intra prediction may be performed in the multimedia H/W IP 260.

The inter prediction may be called an inter frame prediction, and the intra prediction may be called an intra frame prediction.

The mode selection circuit 267 may output mode selection information MI to the entropy coder 285. The mode selection information MI may indicate whether a prediction to be performed in the multimedia H/W IP 260 is the inter prediction or the intra prediction.

The subtractor 269 may calculate a first residual RES1 by subtracting the macroblock PMBi or RFj', which is output from the mode selection circuit 267, from the $i^{th}$ macroblock SMBi of the filtered current frame FCF, i.e., the current macroblock. For example, the first residual RES1 may be a macroblock.

Figure 5:
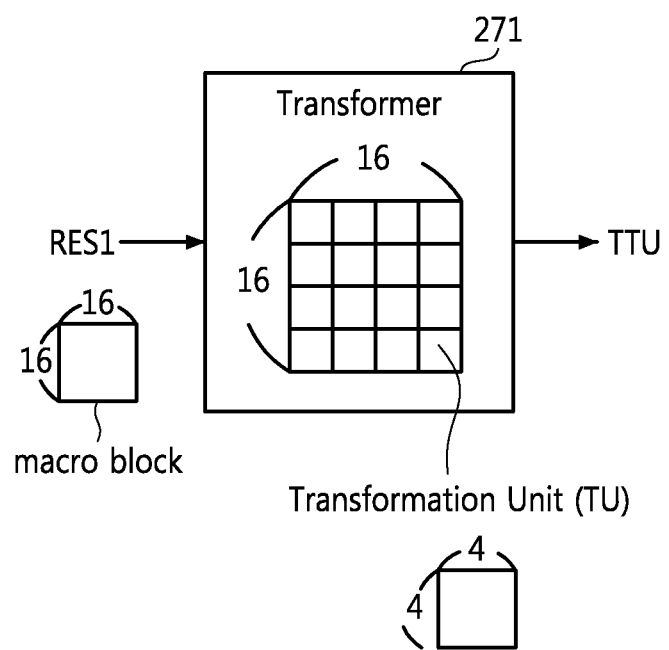
FIG. 5 is a block diagram explaining the operation of a transformer illustrated in FIG. 3.

FIG. 5 is a block diagram explaining the operation of the transformer 271 illustrated in FIG. 3. The transformer 271 may transform time domain data into frequency domain data. For example, the transformer 271 may perform discrete cosine transform (DCT) on the first residual RES1, and may output a transformed macroblock TTU.

For example, when a macroblock corresponding to the first residual RES1 is 16*16, the transformer 271 may perform the DCT on each four-by-four transformation unit TU. Accordingly, the transformer 271 may divide a single macroblock into 16 transformation units TU, and may perform the DCT on each of the transformation units TU. The size of a macroblock and the size of a transformation unit TU illustrated in FIG. 5 are just examples, and the operation of the transformer 271 is not limited thereto.

The quantization circuit 273 may quantize the transformed macroblock TTU using a second parameter PAR2, and may output a quantized macroblock QMB. The second parameter PAR2 may include at least one of a quantization parameter QP, a Q-matrix control parameter MCS, a rounding offset control parameter RCS, a bit conversion enable signal BCS, and a macroblock skip enable signal MSS.

For clarity of the description, it is illustrated that the quantization circuit 273 includes the quantizer 275, the Q-matrix circuit 277, and the ROCC 279 in FIG. 3, but the quantization circuit 273 may include at least one of the quantizer 275, the Q-matrix circuit 277, and the ROCC 279 in other embodiments.

Also, it is illustrated in FIG. 3 that the multimedia H/W IP 260 includes the bit change circuit 281 and the macroblock skip decision circuit 283 for clarity of the description, but the multimedia H/W IP 260 may include at least one of the bit change circuit 281 and the macroblock skip decision circuit 283 in other embodiments, and not necessarily both.

Control signals included in the second parameter PAR2 may be determined depending on which of the elements 275, 277, 279, 281, and 283 the multimedia H/W IP 260 includes. The second parameter PAR2 may include at least one of control signals QP, MCS, RCS, MSS, and BCS.

In some embodiments, the quantization circuit 273 may include the quantizer 275 only. At this time, the quantization circuit 273 may quantize the transformed macroblock TTU using the quantizer 275, and may output the quantized macroblock QMB. In other embodiments, the quantization circuit 273 may include the Q-matrix circuit 277 only. At this time, the quantization circuit 273 may quantize the transformed macroblock TTU using the Q-matrix circuit 277, and may output the quantized macroblock QMB.

In still other embodiments, the quantization circuit 273 may include the quantizer 275 and the ROCC 279. At this time, the quantization circuit 273 may quantize the transformed macroblock TTU using the quantizer 275 and the ROCC 279, and may output the quantized macroblock QMB. In even other embodiments, the quantization circuit 273 may include the Q-matrix circuit 277 and the ROCC 279. At this time, the quantization circuit 273 may quantize the transformed macroblock TTU using the Q-matrix circuit 277 and the ROCC 279, and may output the quantized macroblock QMB.

In yet other embodiments, the quantization circuit 273 may include the quantizer 275 and the Q-matrix circuit 277. At this time, the quantization circuit 273 may quantize the transformed macroblock TTU using the quantizer 275 and the Q-matrix circuit 277, and may output the quantized macroblock QMB. In further embodiments, the quantization circuit 273 may include the quantizer 275, the Q-matrix circuit 277, and the ROCC 279. At this time, the quantization circuit 273 may quantize the transformed macroblock TTU using the quantizer 275, the Q-matrix circuit 277 and the ROCC 279, and may output the quantized macroblock QMB.

The quantizer 275 may quantize the transformed macroblock TTU using the quantization parameter QP included in the second parameter PAR2. The macroblock level controller 287 may increase or decrease the value of the quantization parameter QP.

The quantization circuit 273 may output a quantization parameter QP' to the entropy coder 285. For example, the quantization parameter QP' output from the quantization circuit 273 may be the same as or different from the quantization parameter QP output from the macroblock level controller 287.

FIG. 6 is a conceptual diagram explaining the operation of the Q-matrix circuit 277 illustrated in FIG. 3. The Q-matrix of the Q-matrix circuit 277 may include 16 unit quantization parameters UQP1 through UQP16. The Q-matrix may be a unit quantization parameter matrix. The quantization parameter QP may be an average of the 16 unit quantization parameters UQP1 through UQP16. The quantization parameter QP' output from the quantization circuit 273, may be the same as or different from the average.

The Q-matrix circuit 277 may quantize a $k^{th}$ transformation unit TUk using a $k^{th}$ unit quantization parameter UQPk, where k=1 to 16. The macroblock level controller 287 may decrease or increase the value of each of the unit quantization parameters UQP1 through UQP16.

As described above, a single macroblock may include 16 transformation units. The Q-matrix control parameter MCS included in the second parameter PAR2 may control the unit quantization parameters UQP1 through UQP16.

Figure 7:
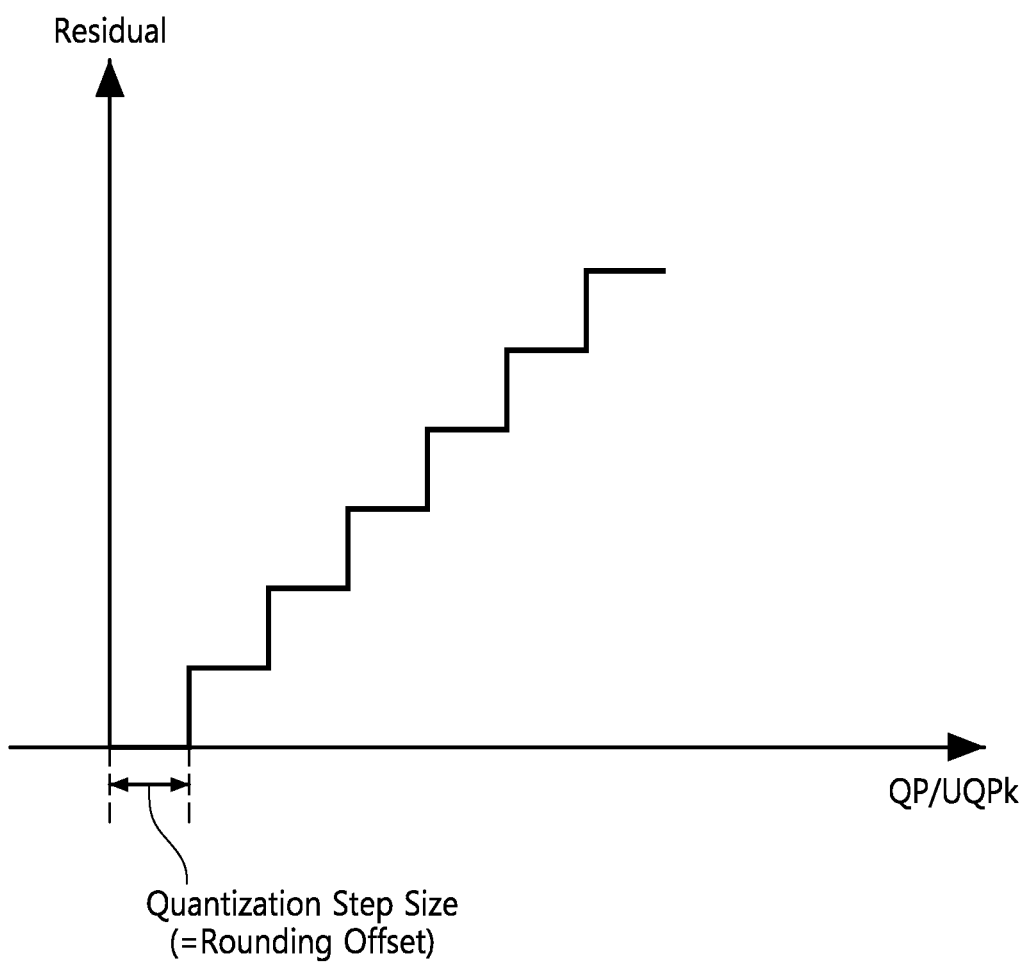
FIG. 7 is a conceptual diagram explaining the operation of a rounding offset control circuit illustrated in FIG. 3.

FIG. 7 is a conceptual diagram explaining the operation of the ROCC 279 illustrated in FIG. 3. Referring to FIGS. 3 and 7, the ROCC 279 may adjust a quantization step size of the quantization parameter QP or each unit quantization parameter UQPk by adjusting a rounding offset (or a quantization step size). Here, the term "rounding offset" may be used to indicate a round-off error or a quantization error induced by quantization.

The macroblock level controller 287 may increase or decrease the quantization step size of the quantization parameter QP. The macroblock level controller 287 may also increase or decrease the quantization step size of each of the unit quantization parameters UQP1 through UQP16.

In some embodiments, when the quantization circuit 273 includes the quantizer 275 and the ROCC 279, the ROCC 279 may increase or decrease the quantization step size of the quantization parameter QP using the rounding offset control parameter RCS output from the macroblock level controller 287. In other embodiments, when the quantization circuit 273 includes the Q-matrix circuit 277 and the ROCC 279, the ROCC 279 may increase or decrease the quantization step size of each of the unit quantization parameters UQP1 through UQP16 using the rounding offset control parameter RCS output from the macroblock level controller 287.

As described above, the quantization circuit 273 may quantize the transformed macroblock TTU, and may output the quantized macroblock QMB using at least one of the quantizer 275, the Q-matrix circuit 277 and the ROCC 279.

Figure 8:
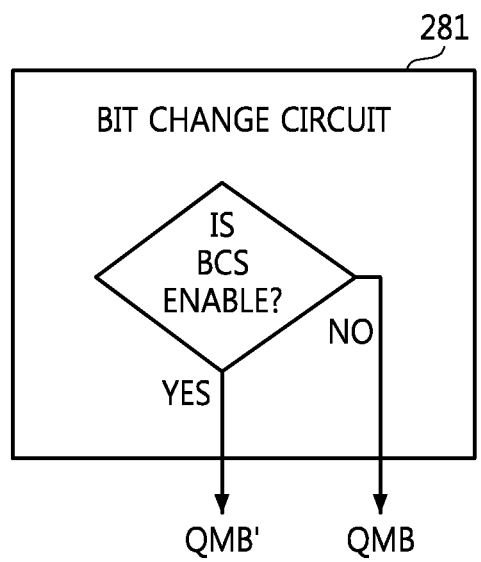
FIG. 8 is a conceptual diagram explaining the operation of a bit change circuit illustrated in FIG. 3.

FIG. 8 is a conceptual diagram explaining the operation of the bit change circuit 281 illustrated in FIG. 3. Referring to FIGS. 3 and 8, the bit change circuit 281 may change a first bit (e.g., data 1) included in the quantized macroblock QMB into a second bit (e.g., data 0) in response to the bit conversion enable signal BCS.

When the bit change circuit 281 is enabled in response to the bit conversion enable signal BCS, the bit change circuit 281 may change all first bits (e.g., bit 1) included in the quantized macroblock QMB to second bits (e.g., data 0), and may output first data BMB (=QMB') including only second bits. When the bit change circuit 281 is disabled in response to the bit conversion enable signal BCS, the bit change circuit 281 may output the quantized macroblock QMB as the first data BMB (=QMB). The first data BMB may be output in units of macroblocks.

The macroblock skip decision circuit 283 may decide whether to transmit the first data BMB (=QMB or QMB') from the bit change circuit 281 to the entropy coder 285 in response to the macroblock skip enable signal MSS. When the macroblock skip decision circuit 283 is enabled in response to the macroblock skip enable signal MSS, the macroblock skip decision circuit 283 may transmit only second data DMB, which indicates that the first data BMB (=QMB or QMB') is skipped, to the entropy coder 285. The second data DMB may be one bit. Here, the word "skip" means no transmission of the first data BMB (=QMB or QMB') to the entropy coder 285.

When the macroblock skip decision circuit 283 is disabled in response to the macroblock skip enable signal MSS, the macroblock skip decision circuit 283 may transmit the first data BMB (=QMB or QMB') from the bit change circuit 281 as the second data DMB to the entropy coder 285.

The entropy coder 285 may receive the second data DMB, and may transmit a current macroblock bit rate MBBR, which indicates the bit rate of a current macroblock (or the number of bits generated in the current macroblock), to the macroblock level controller 287 based on the second data DMB. For example, when the first data BMB (=QMB or QMB') is skipped by the macroblock skip decision circuit 283, the current macroblock bit rate MBBR may be determined by the number (e.g., 1) of bits included in the second data DMB indicating that the first data BMB (=QMB or QMB') has been skipped.

In addition, the entropy coder 285 may transmit the current macroblock bit rate MBBR for each macroblock to the macroblock level controller 287, and may transmit the bit rate PBR indicating the bit rate (or the number of generated bits) of the filtered current frame FCF to the CPU 210. At this time, the bit rate PBR may be used as the bit rate of a previous frame to adjust the bit rate of a subsequent frame.

The entropy coder 285 may calculate the bit rate PBR of the current frame by adding the bit rates of respective macroblocks SMBi. The entropy coder 285 may encode the second data DMB output from the macroblock skip decision circuit 283, the mode selection information MI, and the quantization parameter QP' output from the quantization circuit 273 with respect to each macroblock, and may generate the encoded bit stream EBS for the current frame.

The macroblock level controller 287 may compare the second reference bit rate RBR2 with the current macroblock bit rate MBBR, and may transmit to the elements 273, 281, and/or 283 the second parameter PAR2 in order to control the bit rate of a subsequent macroblock according to the comparison result.

The inverse quantization circuit 289-1 may inverse-quantize the second data DMB output from the macroblock skip decision circuit 283, and may output an inverse-quantized macroblock to the inverse transformer 289-2. The inverse transformer 289-2 may perform inverse DCT (IDCT) on the inverse-quantized macroblock, and may output a second residual RES2 according to the IDCT result. The second residual RES2 may be a macroblock.

The adder 289-3 may add the second residual RES2 and the macroblock PMBi or RFj' output from the mode selection circuit 267, and may output the macroblock RFj' that is to be restored. The loop filter 289-4 may filter the macroblock RFj' that is to be restored, and may output a restored macroblock RFj. The restored macroblock RFj may be stored in the second memory device 500 via the bus 201 and the second memory controller 240.

FIG. 9 is a table explaining the operation of encoding tools illustrated in FIG. 3. Referring to FIGS. 1 through 9, the controller 200 may use encoding tools to adjust the bit rate (or the number of generated bits) of a current macroblock in the filtered current frame FCF.

In the table illustrated in FIG. 9, the term "overshoot" means that the bit rate PBR of a previous frame is greater than the first reference bit rate RBR1 or that the bit rate of a previous macroblock is greater than the second reference bit rate RBR2. The term "undershoot" means that the bit rate PBR of a previous frame is less than the first reference bit rate RBR1 or that the bit rate of a previous macroblock is less than the second reference bit rate RBR2.

Strictly, a tool for adjusting the cutoff frequency of the pre-processing circuit 250 may be different from encoding tools in the table illustrated in FIG. 9. However, for clarity of the description, the tool for adjusting the cutoff frequency is included in the encoding tools.

Figure 10:
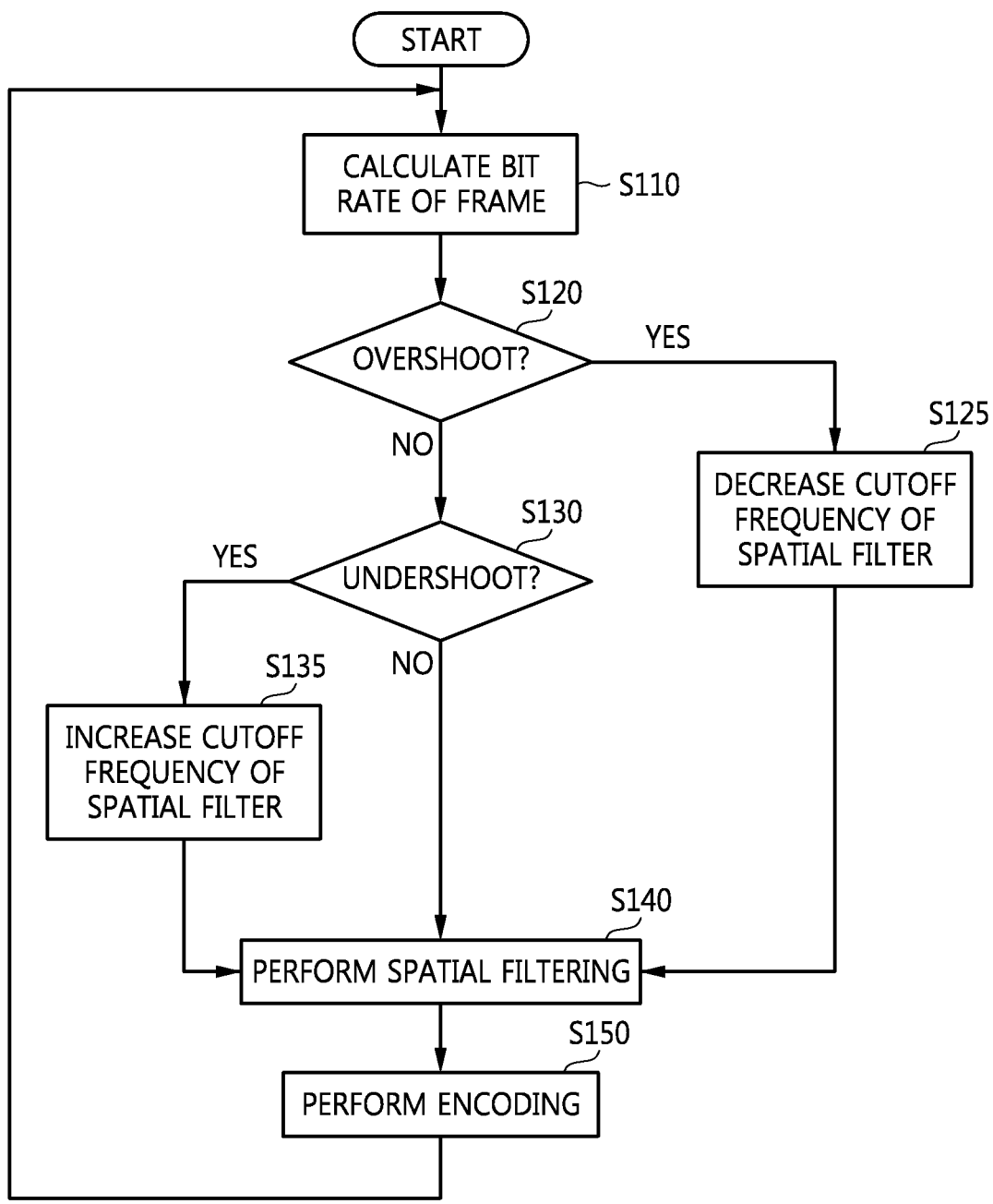
FIG. 10 is a flowchart of the operation of the pre-processing circuit illustrated in FIG. 1.

FIG. 10 is a flowchart of the operation of the pre-processing circuit 250 illustrated in FIG. 1. Referring to FIGS. 1, 2, 3, 9, and 10, the entropy coder 285 of the multimedia H/W IP 260 may calculate the bit rate PBR of each frame in operation S110.

When the current frame CF is processed, the bit rate PBR may be the bit rate of a previous frame. The CPU 210 may compare the first reference bit rate RBR1 with the bit rate PBR of the previous frame in operation S120. When the bit rate PBR of the previous frame is greater than the first reference bit rate RBR1, that is, in case of overshoot in operation S120, the CPU 210 may generate the first parameter PAR1 for decreasing the cutoff frequency and may transmit the first parameter PAR1 to the pre-processing circuit 250.

The pre-processing circuit 250, e.g., a spatial filter, may decrease the cutoff frequency using the first parameter PAR1 in operation S125. Therefore, the number of bits generated when the current frame CF is encoded may be decreased. When the bit rate PBR of the previous frame is less than the first reference bit rate RBR1, that is, in case of undershoot in operation S130, the CPU 210 may generate the first parameter PAR1 for increasing the cutoff frequency and may transmit the first parameter PAR1 to the pre-processing circuit 250.

The pre-processing circuit 250, e.g., a spatial filter, may increase the cutoff frequency using the first parameter PAR1 in operation S135. Therefore, the number of bits generated when the current frame CF is encoded may be increased.

When the bit rate PBR of the previous frame is equal to the first reference bit rate RBR1 in operations S120 and S130, the CPU 210 may generate the first parameter PAR1 for maintaining the cutoff frequency and may transmit the first parameter PAR1 to the pre-processing circuit 250. The pre-processing circuit 250, e.g., a spatial filter, may maintain the cutoff frequency using the first parameter PAR1.

After adjusting the cutoff frequency, the pre-processing circuit 250, e.g., a spatial filter may filter high-frequency components from the current frame CF using the adjusted cutoff frequency, and may output the filtered current frame FCF in operation S140. In other words, the spatial filter may perform spatial filtering on the current frame CF in operation S140.

The multimedia H/W IP 260 may perform encoding while adjusting the bit rate of a current macroblock in the filtered current frame FCF based on the bit rate of a previous macroblock in operation S150.

Figure 11:
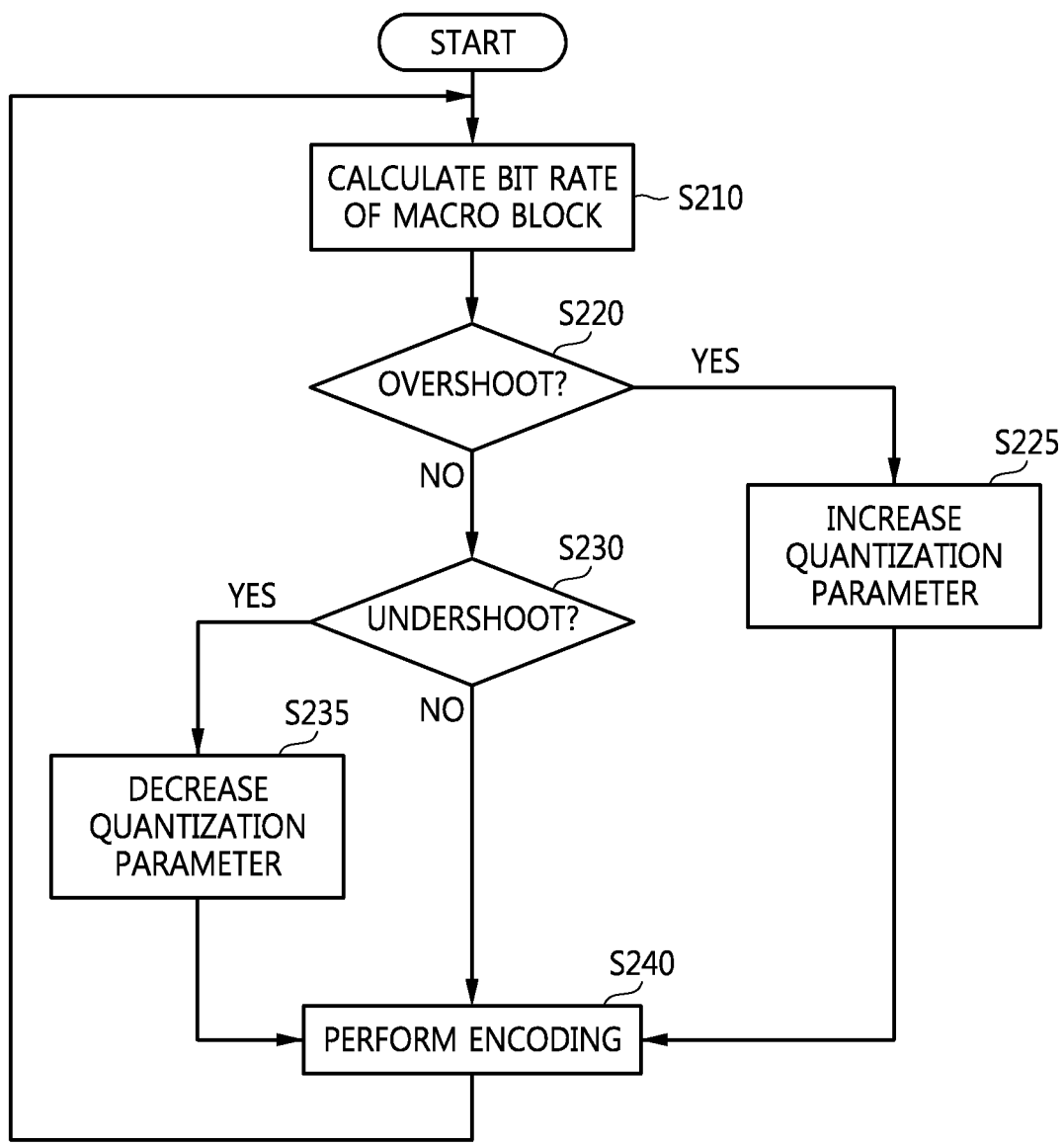
FIG. 11 is a flowchart of the operation of a quantizer illustrated in FIG. 3.

FIG. 11 is a flowchart of the operation of the quantizer 275 illustrated in FIG. 3. The operation of the quantizer 275 will be described with reference to FIGS. 1, 2, 3, 9, and 11. The entropy coder 285 of the multimedia H/W IP 260 may calculate the macroblock bit rate MBBR in operation 5210.

When a current macroblock is processed, the macroblock bit rate MBBR may be the bit rate of a previous macroblock. The macroblock level controller 287 may compare the second reference bit rate RBR2 with the bit rate MBBR of the previous macroblock in operation S220.

When the bit rate MBBR of the previous macroblock is greater than the second reference bit rate RBR2, that is, in case of overshoot in operation S220, the macroblock level controller 287 may generate the second parameter PAR2 for increasing the quantization parameter QP, and may transmit the second parameter PAR2 to the quantizer 275.

The quantizer 275 may increase the quantization parameter QP using the second parameter PAR2 in operation 5225. Therefore, the number of bits in the quantized macroblock QMB may be decreased. When the bit rate MBBR of the previous macroblock is less than the second reference bit rate RBR2, that is, in case of undershoot in operation S230, the macroblock level controller 287 may generate the second parameter PAR2 for decreasing the quantization parameter QP, and may transmit the second parameter PAR2 to the quantizer 275.

The quantizer 275 may decrease the quantization parameter QP using the second parameter PAR2 in operation S235. Therefore, the number of bits in the quantized macroblock QMB may be increased. When the bit rate MBBR of the previous macroblock is equal to the second reference bit rate RBR2 in operations S220 and S230, the macroblock level controller 287 may generate the second parameter PAR2 for maintaining the quantization parameter QP, and may transmit the second parameter PAR2 to the quantizer 275.

The quantizer 275 may maintain the quantization parameter QP using the second parameter PAR2. The multimedia H/W IP 260 may encode the quantized macroblock QMB in operation S240.

Figure 12:
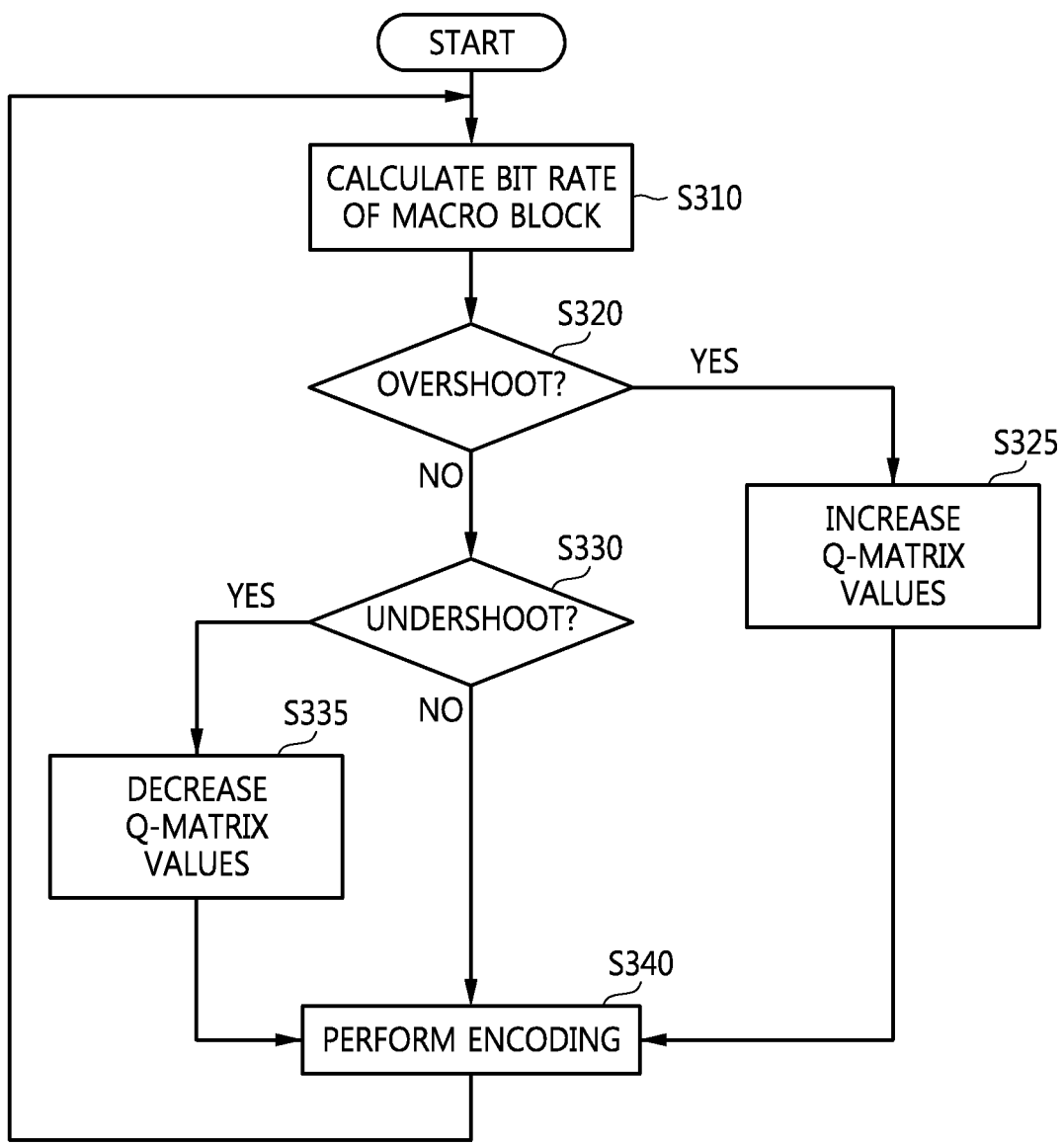
FIG. 12 is a flowchart of the operation of the Q-matrix circuit illustrated in FIG. 3.

FIG. 12 is a flowchart of the operation of the Q-matrix circuit 277 illustrated in FIG. 3. The operation of the Q-matrix circuit 277 will be described with reference to FIGS. 1, 2, 3, 9, and 12. The entropy coder 285 of the multimedia H/W IP 260 may calculate the macroblock bit rate MBBR in operation S310. When a current macroblock is processed, the macroblock bit rate MBBR may be the bit rate of a previous macroblock.

The macroblock level controller 287 may compare the second reference bit rate RBR2 with the bit rate MBBR of the previous macroblock in operation S320. When the bit rate MBBR of the previous macroblock is greater than the second reference bit rate RBR2, that is, in case of overshoot in operation S320, the macroblock level controller 287 may generate the second parameter PAR2 for increasing Q-matrix values (i.e., unit quantization parameters), and may transmit the second parameter PAR2 to the Q-matrix circuit 277.

The Q-matrix circuit 277 may increase the Q-matrix values using the second parameter PAR2 in operation S325. Therefore, the number of bits in the quantized macroblock QMB may be decreased. When the bit rate MBBR of the previous macroblock is less than the second reference bit rate RBR2, that is, in case of undershoot in operation S330, the macroblock level controller 287 may generate the second parameter PAR2 for decreasing the Q-matrix values (i.e., unit quantization parameters), and may transmit the second parameter PAR2 to the Q-matrix circuit 277.

The Q-matrix circuit 277 may decrease the Q-matrix values using the second parameter PAR2 in operation S335. Therefore, the number of bits in the quantized macroblock QMB may be increased. When the bit rate MBBR of the previous macroblock is equal to the second reference bit rate RBR2 in operations S320 and S330, the macroblock level controller 287 may generate the second parameter PAR2 for maintaining the Q-matrix values, and may transmit the second parameter PAR2 to the Q-matrix circuit 277. The Q-matrix circuit 277 may maintain the Q-matrix values using the second parameter PAR2. The multimedia H/W IP 260 may encode the quantized macroblock QMB in operation S340.

Figure 13:
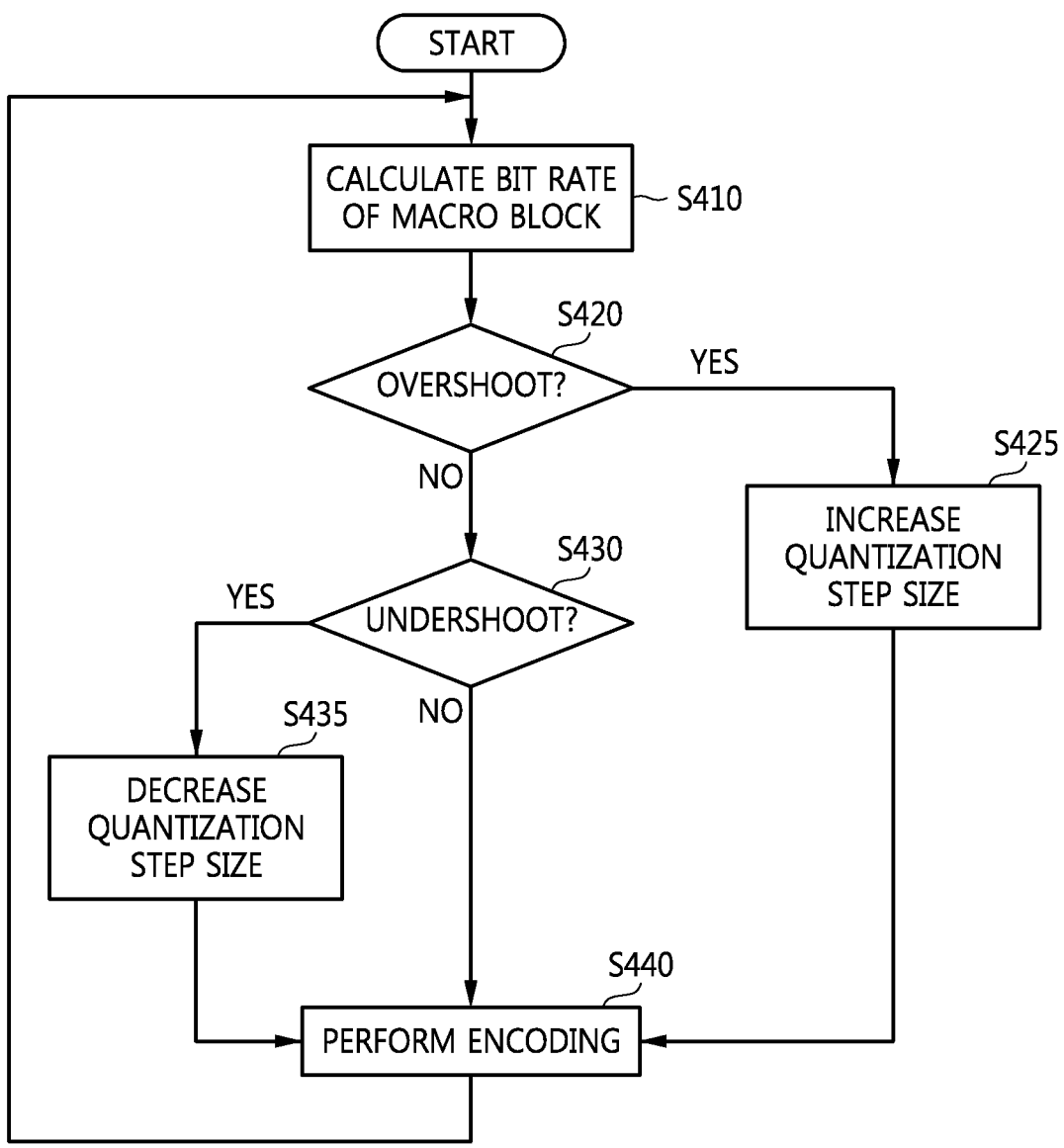
FIG. 13 is a flowchart of the operation of the rounding offset control circuit illustrated in FIG. 3.

FIG. 13 is a flowchart of the operation of the ROCC 279 illustrated in FIG. 3. The operation of the ROCC 279 will be described with reference to FIGS. 1, 2, 3, 9, and 13.

The entropy coder 285 of the multimedia H/W IP 260 may calculate the macroblock bit rate MBBR in operation S410. When a current macroblock is processed, the macroblock bit rate MBBR may be the bit rate of a previous macroblock.

The macroblock level controller 287 may compare the second reference bit rate RBR2 with the bit rate MBBR of the previous macroblock in operation S420. When the bit rate MBBR of the previous macroblock is greater than the second reference bit rate RBR2, that is, in case of overshoot in operation S420, the macroblock level controller 287 may generate the second parameter PAR2 for increasing a quantization step size, and may transmit the second parameter PAR2 to the ROCC 279.

The ROCC 279 may increase the quantization step size of the quantizer 275 and/or the Q-matrix circuit 277 using the second parameter PAR2 in operation S425. Therefore, the number of bits in the quantized macroblock QMB may be decreased.

When the bit rate MBBR of the previous macroblock is less than the second reference bit rate RBR2, that is, in case of undershoot in operation S430, the macroblock level controller 287 may generate the second parameter PAR2 for decreasing the quantization step size, and may transmit the second parameter PAR2 to the ROCC 279.

The ROCC 279 may decrease the quantization step size of the quantizer 275 and/or the Q-matrix circuit 277 using the second parameter PAR2 in operation S435. Therefore, the number of bits in the quantized macroblock QMB may be increased.

When the bit rate MBBR of the previous macroblock is equal to the second reference bit rate RBR2 in operations S420 and S430, the macroblock level controller 287 may generate the second parameter PAR2 for maintaining the quantization step size, and may transmit the second parameter PAR2 to the ROCC 279. The ROCC 279 may maintain the quantization step size of the quantizer 275 and/or the Q-matrix circuit 277 using the second parameter PAR2. The multimedia H/W IP 260 may encode the quantized macroblock QMB in operation S440.

Figure 14:
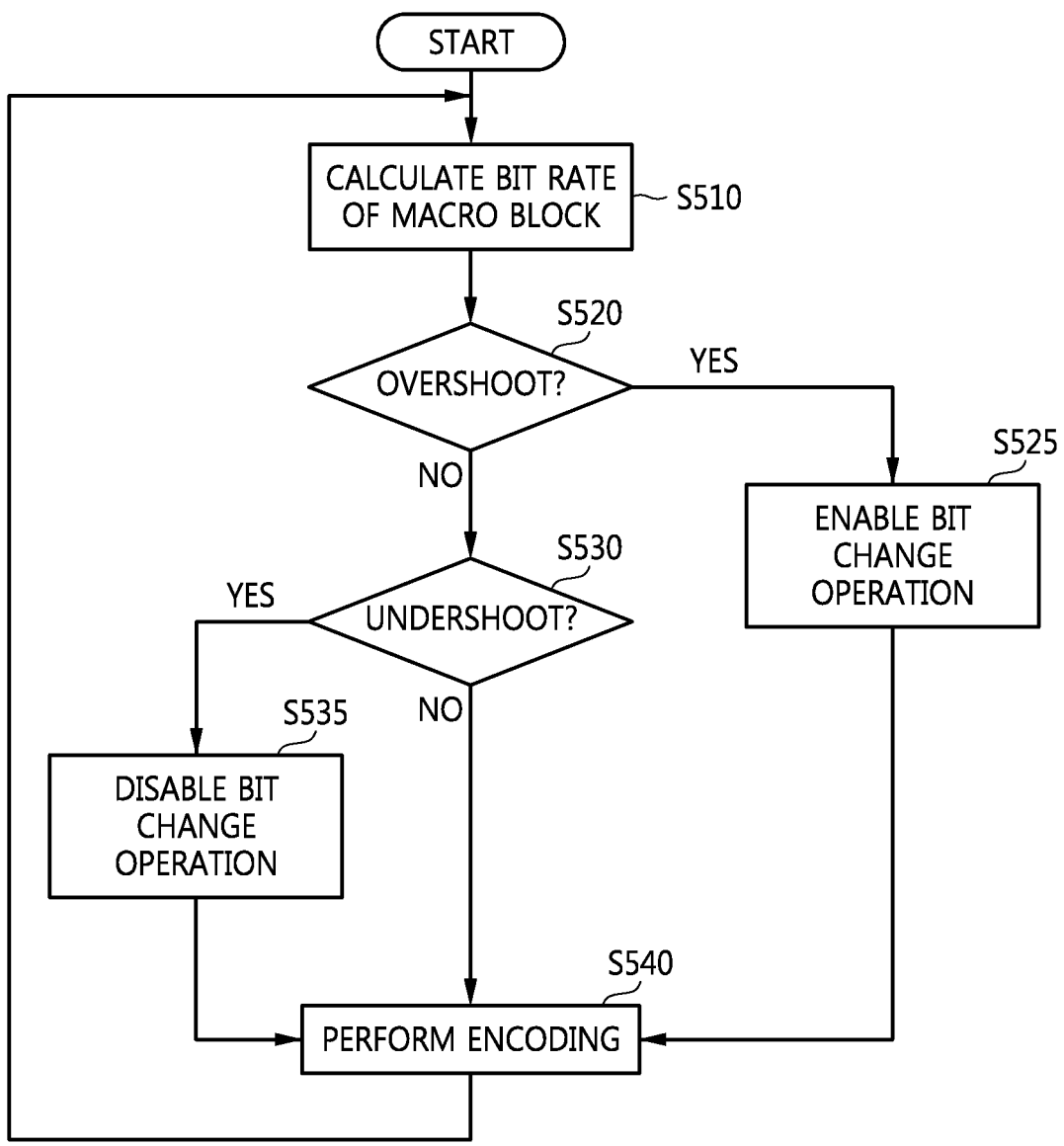
FIG. 14 is a flowchart of the operation of the bit change circuit illustrated in FIG. 3.

FIG. 14 is a flowchart of the operation of the bit change circuit 281 illustrated in FIG. 3. The operation of the bit change circuit 281 will be described with reference to FIGS. 1, 2, 3, 9, and 14. The entropy coder 285 of the multimedia H/W IP 260 may calculate the macroblock bit rate MBBR in operation S510. When a current macroblock is processed, the macroblock bit rate MBBR may be the bit rate of a previous macroblock.

The macroblock level controller 287 may compare the second reference bit rate RBR2 with the bit rate MBBR of the previous macroblock in operation S520. When the bit rate MBBR of the previous macroblock is greater than the second reference bit rate RBR2, that is, in case of overshoot in operation S520, the macroblock level controller 287 may generate the bit change enable signal BCS that is enabled, and may transmit the enabled bit change enable signal BCS to the bit change circuit 281.

The bit change circuit 281 may change first bits into second bits in the quantized macroblock QMB, and may output the first data BMB (=QMB') in response to the enabled bit change enable signal BCS in operation S525. Therefore, the number of bits in the quantized macroblock QMB may be decreased.

When the bit rate MBBR of the previous macroblock is equal to or less than the second reference bit rate RBR2, that is, in case of undershoot in operation S530, the macroblock level controller 287 may generate the bit change enable signal BCS that is disabled, and may transmit the disabled bit change enable signal BCS to the bit change circuit 281.

The bit change circuit 281 may be disabled in response to the disabled bit change enable signal BCS in operation S535. Accordingly, the bit change circuit 281 may output the first data BMB (=QMB) without performing bit change in operation S535. The entropy coder 285 of the multimedia H/W IP 260 may perform encoding in operation S540.

Figure 15:
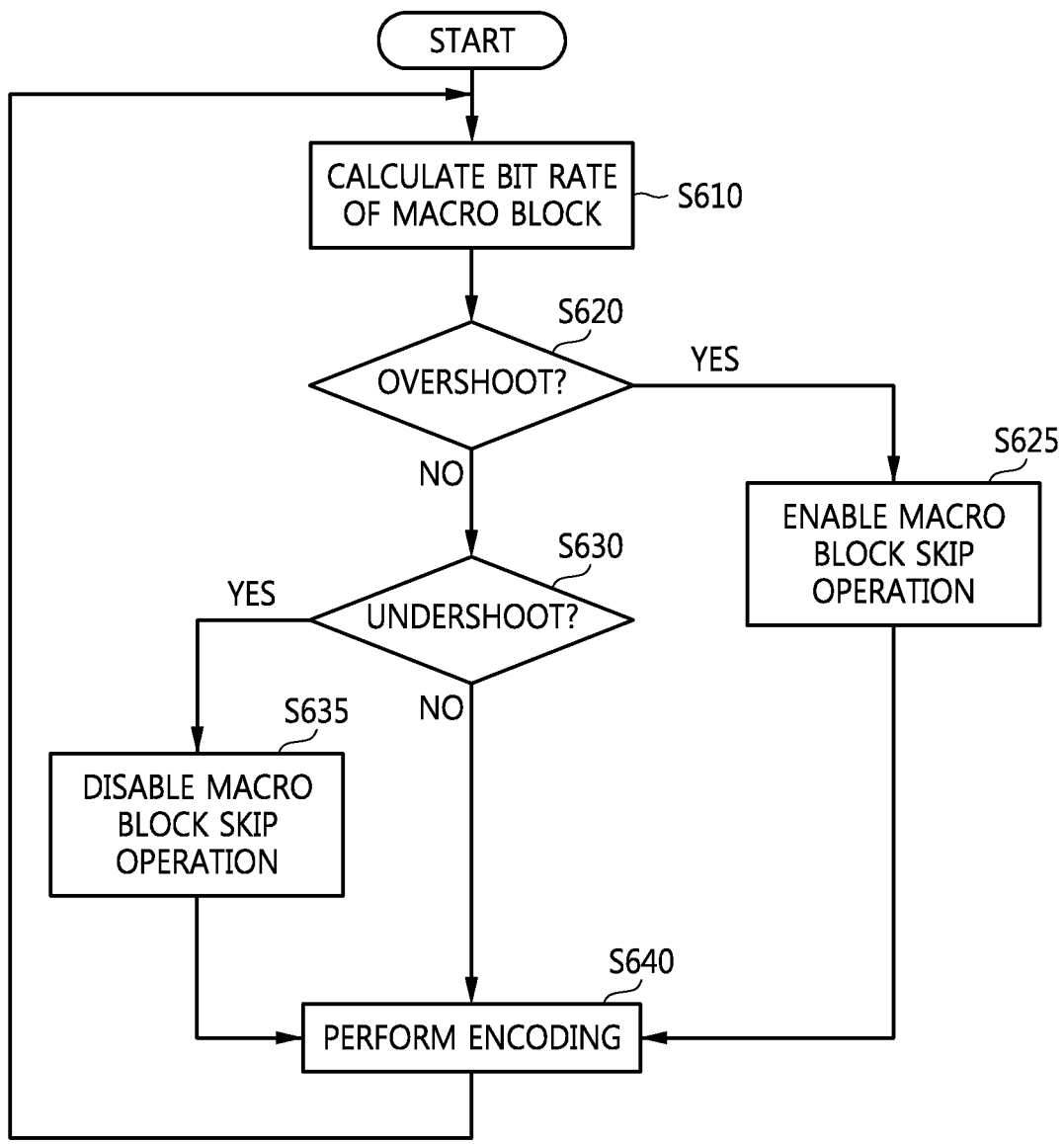
FIG. 15 is a flowchart of the operation of a macroblock skip circuit illustrated in FIG. 3.

FIG. 15 is a flowchart of the operation of the macroblock skip circuit 283 illustrated in FIG. 3. The operation of the macroblock skip circuit 283 will be described with reference to FIGS. 1, 2, 3, 9, and 15. The entropy coder 285 of the multimedia H/W IP 260 may calculate the macroblock bit rate MBBR in operation S610.

When a current macroblock is processed, the macroblock bit rate MBBR may be the bit rate of a previous macroblock. The macroblock level controller 287 may compare the second reference bit rate RBR2 with the bit rate MBBR of the previous macroblock in operation S620.

When the bit rate MBBR of the previous macroblock is greater than the second reference bit rate RBR2, that is, in case of overshoot in operation S620, the macroblock level controller 287 may generate the macroblock skip enable signal MSS that is enabled, and may transmit the enabled macroblock skip enable signal MSS to the macroblock skip circuit 283.

The macroblock skip circuit 283 may not transmit the macroblock BMB (=QMB or QMB') from the bit change circuit 281 to the entropy coder 285 in response to the enabled macroblock skip enable signal MSS. At this time, the macroblock skip circuit 283 may transmit to the entropy coder 285 the second data DMB indicating that the macroblock BMB (=QMB or QMB') output from the bit change circuit 281 is not transmitted.

When the bit rate MBBR of the previous macroblock is equal to or less than the second reference bit rate RBR2, that is, in case of undershoot in operation S630, the macroblock level controller 287 may generate the macroblock skip enable signal MSS that is disabled, and may transmit the disabled macroblock skip enable signal MSS to the macroblock skip circuit 283.

The macroblock skip circuit 283 may be disabled in response to the disabled macroblock skip enable signal MSS in operation S635. Accordingly, the macroblock skip circuit 283 may transmit the first data BMB (=QMB or QMB') from the bit change circuit 281 to the entropy coder 285 as the second data DMB. The entropy coder 285 of the multimedia H/W IP 260 may encode the second data DMB in operation S640.

Figure 16:
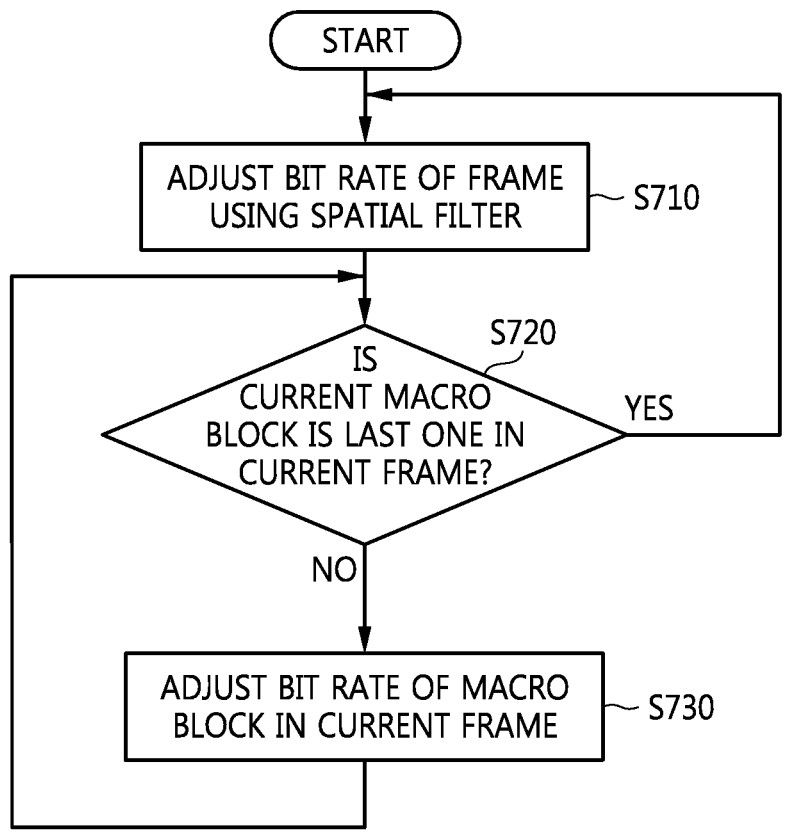
FIG. 16 is a flowchart of the operation of a system on chip illustrated in FIG. 1.

FIG. 16 is a flowchart of the operation of the SoC 200 illustrated in FIG. 1. Referring to FIGS. 1 through 16, a spatial filter may adjust the bit rate of a frame in operation S710.

When a current macroblock is the last one in the current frame in operation S720, the entropy coder 285 of the multimedia H/W IP 260 may calculate the bit rate PBR of the current frame. The spatial filter may adjust the cutoff frequency using the first parameter PAR1 and adjust the bit rate of a subsequent frame using the adjusted cutoff frequency in operation S710.

When the current macroblock is not the last one in the current frame in operation S720, the multimedia H/W IP 260 may adjust the bit rate of the current macroblock in operation S730. The bit rate of each macroblock may be adjusted in operation S730 until the current macroblock is the last one in operation S720.

As described above, according to some embodiments of the present disclosure, an SoC including a video codec may adaptively control the bit rate of a current frame based on the bit rate of a previous frame, and then may adaptively adjust the bit rate of a current macroblock in the current frame based on the bit rate of a previous macroblock in the current frame, thereby increasing an encoding efficiency of the overall system.

While the present disclosure has been particularly shown and described with reference to exemplary embodiments thereof, it will be understood by those of ordinary skill in the art that various changes in forms and details may be made therein without departing from the spirit and scope of the present disclosure as defined by the following claims.

What is claimed is:

1. A system on chip (SoC) comprising:
a central processing unit (CPU) configured to compare a first reference bit rate with a bit rate of a first frame and to generate a first parameter based on comparing the first reference bit rate with the bit rate of the first frame;
a spatial filter configured to adjust a cutoff frequency using the first parameter, to filter high-frequency components from a second frame using the adjusted cutoff frequency, and to output the filtered second frame; and
a video codec configured to adjust a bit rate of a second macroblock in the filtered second frame using a second parameter generated based on a result of comparing a second reference bit rate with a bit rate of a first macroblock in the filtered second frame,
wherein,
when the bit rate of the first frame is greater than the first reference bit rate, the CPU is configured to generate the first parameter for decreasing the cutoff frequency and transmit the first parameter to the spatial filter, and
when the bit rate of the first frame is less than the first reference bit rate, the CPU is configured to generate the first parameter for increasing the cutoff frequency and transmit the first parameter to the spatial filter, and
wherein the CPU is configured to calculate the second reference bit rate using the first reference bit rate and a number of macroblocks in the filtered second frame,
wherein the video codec comprises:
an entropy coder;
a bit change circuit configured to decide whether to change a first bit included in the second macroblock in response to the second parameter; and
a macroblock skip decision circuit configured to decide whether to transmit a macroblock output from the bit change circuit to the entropy coder in response to the second parameter.

2. The SoC of claim 1, wherein the video codec comprises:
a quantizer configured to quantize the second macroblock using the second parameter; and
a quantization step size adjusting circuit configured to adjust a quantization step size of the quantizer using the second parameter.

3. The SoC of claim 1, wherein the video codec is configured to adjust unit quantization parameters of corresponding units that are related with the second macroblock using the second parameter.

4. The SoC of claim 3, wherein the video codec is configured to adjust a quantization step size of each of the unit quantization parameters using the second parameter.

5. The SoC of claim 1, wherein the entropy coder is configured to calculate the bit rate of the first frame and the bit rate of the first macroblock, and to output an encoded bit stream corresponding to the filtered second frame.

6. The SoC of claim 1, wherein the video codec comprises the spatial filter.

7. A data processing system comprising:
a memory device configured to store a plurality of frames including a first frame and a second frame;
a camera;
a display device; and a controller configured to control the memory device, the camera and the display device, wherein the controller is configured to compare a first reference bit rate with a bit rate of the first frame, to generate a first parameter based on comparing the first reference bit rate with the bit rate of the first frame, to adjust a cutoff frequency using the first parameter, to filter high-frequency components from the second frame using the adjusted cutoff frequency, and to adjust a bit rate of a second macroblock in the filtered second frame using a second parameter generated according to a result of comparing a second reference bit rate with a bit rate of a first macroblock in the filtered second frame, wherein, when the bit rate of the first frame is greater than the first reference bit rate, the controller is configured to generate the first parameter for decreasing the cutoff frequency, and when the bit rate of the first frame is less than the first reference bit rate, the controller is configured to generate the first parameter for increasing the cutoff frequency, and wherein the controller is configured to calculate the second reference bit rate using the first reference bit rate and a number of macroblocks in the filtered second frame, wherein the controller comprises:

an entropy coder;

a bit change circuit configured to decide whether to change a first bit included in the second macroblock in response to the second parameter; and a macroblock skip decision circuit configured to decide whether to transmit a macroblock output from the bit change circuit to the entropy coder in response to the second parameter.

8. The data processing system of claim 7, wherein the controller comprises:

a quantizer configured to quantize the second macroblock using the second parameter; and a quantization step size adjusting circuit configured to adjust a quantization step size of the quantizer using the second parameter.

9. The data processing system of claim 7, wherein the controller is configured to adjust unit quantization parameters of corresponding units that are related with the second macroblock using the second parameter.

10. The data processing system of claim 9, wherein the controller is configured to adjust a quantization step size of each of the unit quantization parameters using the second parameter.

11. A system on chip (SoC) comprising:

a central processing unit (CPU) configured to compare a reference bit rate with a bit rate of a previous frame and to generate a parameter based on comparing the reference bit rate with the bit rate of the previous frame;

a spatial filter configured to adjust a bit rate per frame and to filter predefined frequency components from a current frame; and a video codec configured to adjust a bit rate per macroblock included in the filtered current frame;

wherein the spatial filter is configured to adjust a cutoff frequency using the parameter, and to filter the predefined frequency components from the current frame using the adjusted cutoff frequency, wherein, when the bit rate of the previous frame is greater than the reference bit rate, the CPU is configured to generate the parameter for decreasing the cutoff frequency and transmit the parameter to the spatial filter, and when the bit rate of the previous frame is less than the reference bit rate, the CPU is configured to generate the parameter for increasing the cutoff frequency and transmit the parameter to the spatial filter, and wherein the video codec is configured to adjust a bit rate of a current macroblock in the filtered current frame using a second parameter generated based on a result of comparing a second reference bit rate with a bit rate of a previous macroblock in the filtered current frame, wherein the CPU is configured to calculate the second reference bit rate using the reference bit rate and a number of macroblocks in the filtered second frame, and wherein the video codec comprises:

an entropy coder;

a bit change circuit configured to decide whether to change a first bit included in the current macroblock in response to the second parameter; and a macroblock skip decision circuit configured to decide whether to transmit a macroblock output from the bit change circuit to the entropy coder in response to the second parameter.

* * * * *